Aug. 26, 1947. P. E. LYDDON 2,426,461
GLAND PACKING
Filed Oct. 31, 1944 3 Sheets-Sheet 2
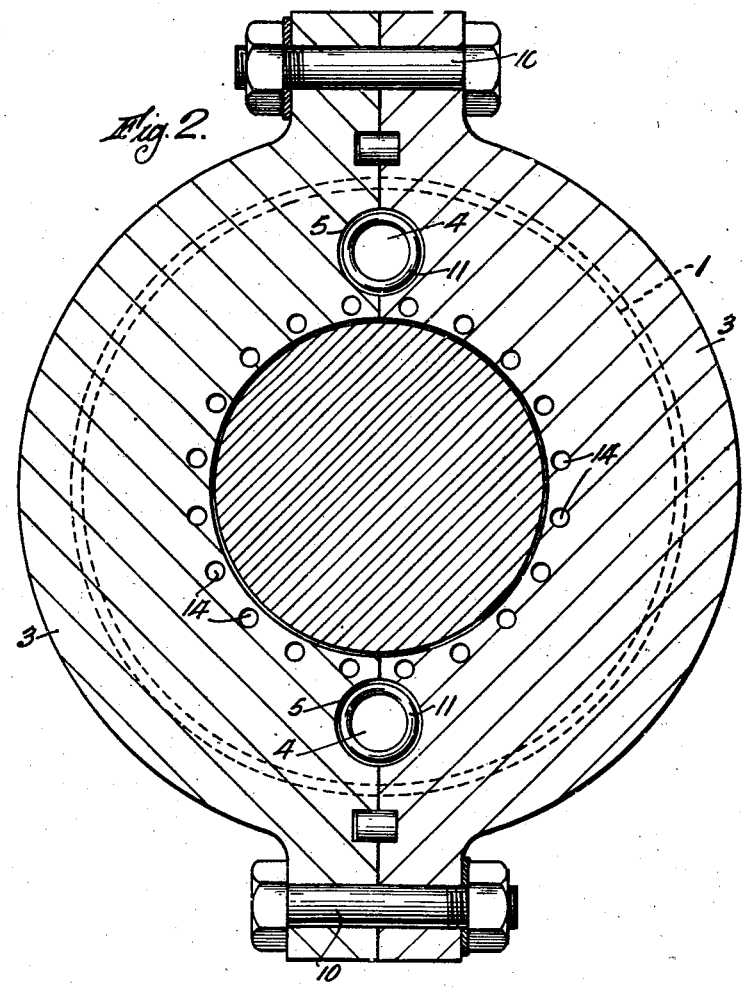
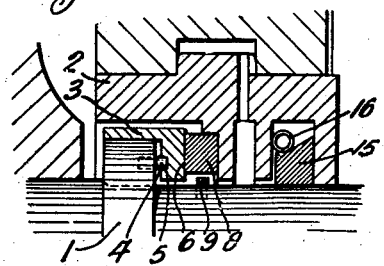
Inventor:
Percy E. Lyddon
By his attorneys,
Baldwin & Wight

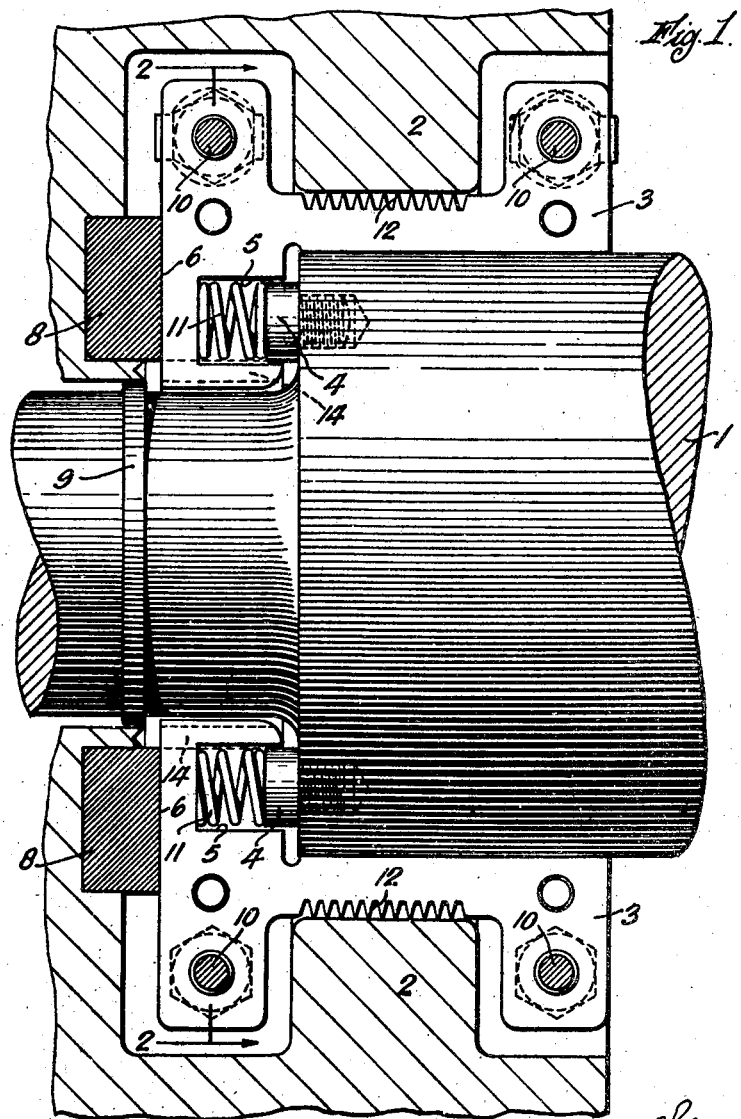

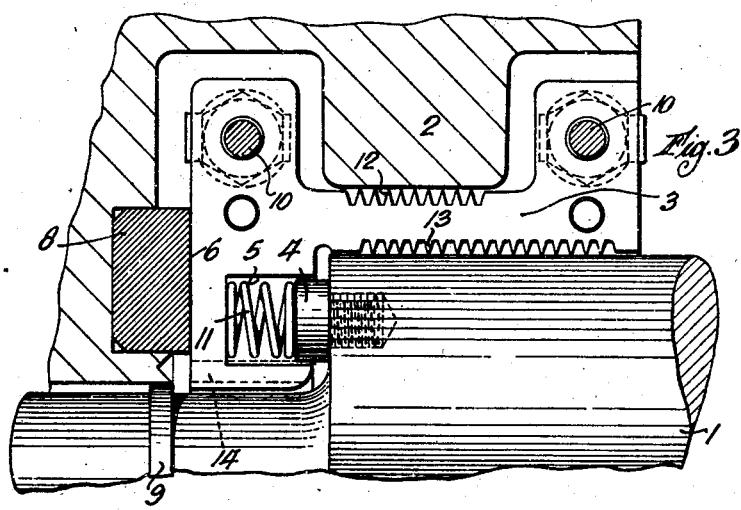
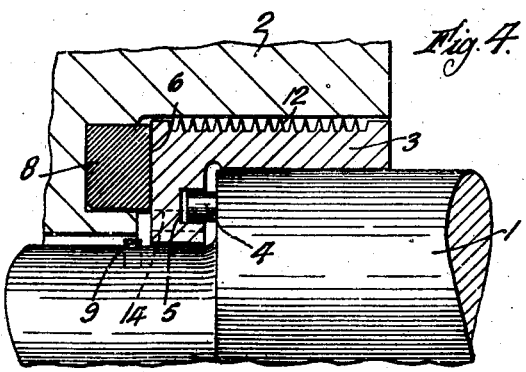
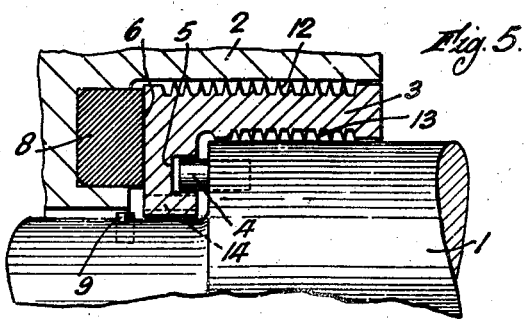

Patented Aug. 26, 1947

2,426,461

UNITED STATES PATENT OFFICE 2,426,461

GLAND PACKING

Percy Edward Lyddon, Worcester, England, assignor to Morgan Crucible Company, Limited, London, England Application October 31, 1944, Serial No. 561,214
In Great Britain November 1, 1943

3 Claims. (Cl. 286—7)

This invention relates to improvements in gland packings between relatively rotating co-axial parts such as a shaft rotating in a housing, for preventing leakage of a fluid medium under pressure from one compartment to an adjoining one of lower pressure or to the atmosphere.

The invention particularly concerns an improvement as compared with normal labyrinth glands employing fins or like throttling projections which rub against or are disposed in close relationship with an opposing surface so as to prevent steam from leaking out of the casing of a turbine at the point of entry of the shaft or between successive stages of the turbine within the cylinder.

In previous practice such labyrinth glands have suffered from the disadvantage that although various steps may be taken to keep it as small as possible an appreciable clearance may exist between the edges of the fins and the opposing surface, and this clearance may become so large as to permit a considerable leakage of steam.

It is well known that the volume of steam escaping through a clearance between opposed surfaces increases very considerably with any increase in the said clearance, and it is the object of the present invention to make this clearance as small as possible and to prevent it from increasing as, for example, by any wear such as is caused in usual designs by small displacements of the axis of rotation of the shaft relative to the housing or stator around it.

According to the invention a packing between relatively rotating co-axial parts comprises a member rotatable with, but axially displaceable with respect to, one part and having a surface in throttling sealing relationship with a corresponding surface of said part and a member carried by the other part, or the other part itself, having a surface against which is caused to bear a corresponding surface of the axially displaceable member.

Thus according to the invention a packing between a shaft and a surrounding housing comprises a collar keyed to the shaft so as to rotate therewith but to be axially displaceable thereon, the inner surface of the collar being in sealing relationship with the shaft and having grooves to produce a labyrinth effect, and a gland of carbon, or any other suitable non-metallic or metallic bearing material, mounted in the housing and presenting a side face into contact with an end surface of the collar. Alternatively, if the material of the housing is suitable, a side face of the housing itself may be presented into contact with the collar.

The inner surface of the collar is not necessarily in labyrinth-sealing relationship with the shaft but may oppose a smooth surface to the shaft, throttling being achieved by providing a very small clearance between the collar and the shaft.

A limit may be imposed on the axial displacement of the axially displaceable member so that after a certain extent of wear at the surfaces which bear against each other in the axial direction no further axial displacement is permitted.

In addition to the sealing surfaces facing the axial direction, the respective relatively rotating parts or members carried thereby, may also have surfaces extending in the axial direction which are in sealing relationship, and a labyrinth effect may be produced between these surfaces by providing fins or like throttling projections on one or both of them.

According to an embodiment of the invention applied to the shaft of a turbine, a collar is mounted on the shaft so as to be rotated thereby but to be free to float axially thereon. The collar may be in one piece or split in half to facilitate assembly. A labyrinth is formed by providing a number of grooves in the inner cylindrical surface of the collar where it opposes the outer cylindrical surface of the shaft. As there is no relative movement between the shaft and the collar it drives the clearance between them can be made very small without appreciable risk. Since the labyrinth sealing surface must participate with any movement of the shaft the clearance remains unaffected by any displacement of the axis of rotation of the shaft and remains constant throughout the life of the turbine.

In order to prevent the leakage of steam from reaching the outer part of the collar a ring of carbon or other suitable bearing material is rigidly fixed in the stator in such a way that a side radial surface of the ring is exposed and mates against an opposing side surface of the rotating collar and the latter is forced axially by the pressure of the steam against the side of the ring and thus forms a sealing surface with it. The rotation of the collar may be ensured by any of the various known means such as by a feather or sliding key or by lugs projecting from a shoulder on the shaft into recesses formed in the collar. or by a screw fixed in the shaft and working in a slotted recess in the collar.

In order to ensure that no rusting shall occur between the bore of the collar and the opposing surface of the shaft such as might impede their relative axial movement, the collar and/or the shaft may be suitably protected at the part where they make contact by, for example, chromium plating.

In cases where the steam pressure is so high as to make the rate of wear of the carbon or other bearing material comparatively rapid the axial movement of the collar, and thus the amount it wears the bearing material by rubbing, is limited by providing a stop secured to or formed on the shaft and projecting above the surface of the shaft, so located that after the bearing material has worn and the collar is moved axially by any desired amount, the latter engages with the stop which then supports the axial thrust of the steam on the collar. Thereby the pressure of the collar on the bearing material is relieved and no further wear by rubbing can take place. Nevertheless the seal between the collar and the bearing material remains effective since at the time the pressure between them is relieved, the opposing surfaces are in the closest possible proximity to one another.

The radial surface of the collar where it opposes the side surface of the bearing material may be mounted with concentric grooves forming a labyrinth in the manner described in my copending application Serial No. 568,855, filed December 19, 1944. In this case a smaller limit is preferably imposed on the axial movement of the collar.

The ring of bearing material may consist of a single piece ring or of a ring made up of a number of segments.

In some cases instead of the collar having a radial surface in sealing relationship with a side surface of the bearing material, these surfaces may be inclined so as to have a radial component as well as an axial component.

The invention is illustrated by way of example in the accompanying drawings in which Figure 1 is a sectional elevation of one form of the gland packing.

Figure 2 is a section on the line 2—2 of Figure 1;

Figures 3, 4 and 5 are part sectional elevations of three modifications of the packing; and Figure 6 is a part sectional elevation showing the gland packing used in conjunction with a carbon sealing ring.

In the drawings 1 indicates a shaft rotating in a housing 2. On the shaft 1 is mounted a collar 3 so as to be capable of axial movement along the shaft but rotatable therewith by reason of the studs 4 carried by the shaft engaging in recesses 5 in the collar.

The end face 6 of the collar bears on the side face of a carbon gland ring 8 mounted in a recess in the housing 2.

An abutment 9 limits the axial displacement of the collar so that after a certain extent of wear of the gland ring 8 no further axial displacement is permitted.

In Figures 3 and 5, the inner peripheral surface of the collar is grooved to provide fins 13 and hence a labyrinth-sealing relationship with the shaft.

In Figures 1, 2, 3, 4 and 5 axial holes 14 are provided in the enlarged end of the collar to equalise the pressure on both sides thereof.

In Figure 6, which is more diagrammatic and where the arrangement is reversed in that the higher fluid pressure is considered to be on the left hand side, a segmental carbon sealing ring 15 surrounded by a garter spring 16 and bearing on the shaft and against the inside of the end wall of the casing, all in known manner, serves to make a final seal, for example to atmosphere.

In comparing the clearance usually allowed with labyrinth glands it will be evident that the clearance between the collar and the shaft and for a corresponding axial length is such that the leakage with the packing of the present invention may be approximately $\frac{1}{10}$ of that of the former; furthermore this clearance remains constant in the working of the turbine. The clearance between the outer axial surface of the collar and the housing may be comparatively great, as no leakage would normally occur there, and no radial force need therefore ever be exerted on the shaft.

Reference to Figures 1, 2 and 3 shows the collar 3 made in two halves secured together by bolts 10. In these figures, also, pressure of springs 11 is applied to the collar to urge its end face 6 against the gland ring 8. This pressure augments that due to the higher fluid pressure on the right hand side of the packing which, per square inch, is a function of the ratio of the area of the right hand end face of the collar to the area of the end face 6 which is in contact with the gland ring 8, which ratio can accordingly be designed to suit requirements. In Figures 4 and 5, representing an example where the fluid pressure drop from the right to the left of the packing is high, spring pressure is not applied and the pressure per square inch on the gland ring 8 is reduced as compared with the pressure on the right hand end face of the collar.

In each of Figures 1, 3, 4 and 5 the outer peripheral surface of the collar, extending in the axial direction adjacent to a cornering surface of the housing, is in labyrinth-sealing relationship with the housing by the provision of the collar with fins 12.

In the course of time when wear has taken place to the extent that the collar reaches the stop no bearing pressure is then exerted at the seal between the end face of the collar and the gland ring 8 although thereafter they remain in the closest possible proximity. The aforesaid labyrinth therefore limits the leakage possible even through this extremely close gap after the described condition has been reached.

The labyrinth may have any of the usual forms and the opposing surface may be of carbon or the like so as to ensure the minimum clearance.

What I claim is:

1. A packing between a shaft and a surrounding housing comprising a collar keyed to the shaft so as to rotate therewith but to be axially displaceable thereon, the inner surface of the collar being in throttling sealing relationship with the shaft, and the outer surface of the collar having grooves to produce a labyrinth-sealing relationship with the surrounding housing, and the housing presenting a surface into contact in the axial direction with a surface of the collar extending away from the shaft, and mutually engaging means on the collar and the shaft respectively serving to impose a limit on the said axial displacement so that after a certain extent of wear at the surfaces which bear against each other in the axial direction no further axial displacement is permitted.

2. A packing between a shaft and a surrounding housing comprising a collar keyed to the shaft so as to rotate therewith but to be axially displaceable thereon, the inner surface of the collar being in throttling sealing relationship with the shaft, and the outer surface of the collar having grooves to produce a labyrinth-sealing relationship with the surrounding housing, a gland of a suitable bearing material embodied in the housing and presenting a side face into contact in the axial direction with a surface of the collar extending away from the shaft, and mutually engaging means on the collar and the shaft respectively serving to impose a limit on the said axial displacement so that after a certain extent of wear at the surfaces which bear against each other in the axial direction no further axial displacement is permitted.

3. A packing as claimed in claim 2 including a spring for applying pressure to the collar to urge it towards the surface against which it bears in the axial direction.

PERCY EDWARD LYDDON.

REFERENCES CITED

The following references are of record in the file of this patent:

UNITED STATES PATENTS

| Number | Name | Date |
| --- | --- | --- |
| 2,249,188 | Stevenson | July 15, 1941 |
| 1,006,714 | Bell | Oct. 24, 1911 |
| 1,880,911 | Durdin | Oct. 4, 1932 |

FOREIGN PATENTS

| Number | Country | Date |
| --- | --- | --- |
| 157,116 | Switzerland | 1932 |
| 414,835 | Great Britain | 1934 |